United States Patent [19]

Dyksterhouse et al.

[11] Patent Number: 5,120,769
[45] Date of Patent: Jun. 9, 1992

[54] PROCESS FOR THE PREPARATION OF THERMOPLASTIC SYNTACTIC FOAM AND THERMOPLASTIC POWDER COMPOSITIONS SUITABLE THEREFOR

[75] Inventors: Joel Dyksterhouse, Petoskey, Mich.; Alan C. Handermann, Charlotte; George E. Husman, Matthews, both of N.C.; Peter G. Ittemann, Fort Mill, S.C.

[73] Assignee: BASF Aktiengesellschaft, Ludwigshafen, Fed. Rep. of Germany

[21] Appl. No.: 516,654

[22] Filed: Apr. 30, 1990

[51] Int. Cl.$^5$ .............................................. C08J 9/236
[52] U.S. Cl. ...................................... 521/54; 521/55; 521/134; 521/135; 521/138; 521/139; 523/218; 523/219
[58] Field of Search ................... 521/54; 523/218, 219

[56] References Cited

U.S. PATENT DOCUMENTS

| | | | |
|---|---|---|---|
| 3,959,197 | 5/1976 | Salyer et al. | 521/54 |
| 4,255,524 | 3/1987 | Dawans et al. | 521/54 |
| 4,330,634 | 5/1982 | Rodaway | 521/54 |
| 4,699,810 | 10/1987 | Blakeman et al. | 521/54 |
| 4,902,722 | 2/1990 | Melber | 521/54 |

Primary Examiner—Morton Foelak
Attorney, Agent, or Firm—William G. Conger

[57] ABSTRACT

Compositions are disclosed which are suitable for the preparation of thermoplastic syntactic foam intermediate and final products. These compositions comprise a slurry or putty containing thermoplastic particles, microballoons, and a non-solvent, optionally in the presence of suitable thickeners, binders, and surfactants. In a preferred embodiment, the composition contains particles of an engineering thermoplastic having a mean particle size less then about 100 μm, microballoons, water as the non-solvent, and a thickener/binder which is a lightly crosslinked polyacrylic acid.

41 Claims, No Drawings

PROCESS FOR THE PREPARATION OF THERMOPLASTIC SYNTACTIC FOAM AND THERMOPLASTIC POWDER COMPOSITIONS SUITABLE THEREFOR

BACKGROUND OF THE INVENTION

1. Field of the Invention

The subject invention pertains to the field of thermoplastic syntactic foams. More particularly, it pertains to a process for preparing thermoplastic syntactic foams by consolidating stable compositions containing fine thermoplastic powder and microballoons dispersed in a non-solvent.

2. Description of the Related Art

Syntactic foams differ from blown foams such as polyurethane foam and expanded polystyrene foam in that the cells in syntactic foams are preformed by way of incorporation of small diameter hollow spheres rather than by the expansion of a blowing agent.

It is known to prepare syntactic foams from thermosetting resins such as unsaturated polyesters, bismaleimides, non-cellular (no blowing agent) polyurethanes, cyanates, thermosetting polyimides, and the like. When the uncured resin is of sufficiently low viscosity, the appropriate microballoons are merely mixed into the resin. When the resin system is too viscous or a solid, then a solvent is generally added. The solvent is selected to be one in which the resin system components are soluble.

Thermoplastic syntactic foams are also known. Such foams have been prepared by admixing in dry form, microballoons and thermoplastic powder followed by consolidation as disclosed in U.S. Pat. No. 4,876,055; or by adding microballoons to a melt of thermoplastic in a kneader or extruder. When thermoplastic powder and microballoons are utilized, these compositions have the disadvantage of difficulty of handling due to the dust created when transferring or pouring, and the ease with which the compositions may be disturbed by air currents, for example those created by forced air ventilations. Such compositions may also be prone to settling, with the higher density thermoplastic particles settling to the bottom of the container, creating variations in composition.

It is further known to utilize a thermoplastic dissolved in a solvent. An example of this method is illustrated by U.S. Pat. No. 4,077,922, wherein an aprotic solvent is utilized to dissolve the thermoplastic, in this case a polyimide. Also known is the use of a combination of an aprotic solvent in conjunction with a dissolution-preventing non-solvent. In this case, the non-solvent is removed prior to subjecting the mold to elevated temperature. Following its removal, the aprotic solvent then solubilizes the polyimide. Both these methods require the use of expensive aprotic solvents which may further create toxicity problems during removal. The second method described above requires a two stage process not well adapted to commercial production. Finally, since the aprotic solvent is soluble in the thermoplastic matrix, its complete removal is problematic.

When a melt of thermoplastic is utilized, the density of the microballoons must generally be high to avoid breakage during the mixing process. When extrusion is utilized, for example, microballoons having densities higher than 1.00 g/cm$^3$ and wall thicknesses of at least approximately 10 percent of their diameter must be used. See, for example, *Plastics Compounding*, Mar.-/Apr., 1981 which describes rapid loss of microballoons by crushing under high shear mixing conditions.

OBJECTS OF THE SUBJECT INVENTION

It is an object of the subject invention to prepare compositions suitable for preparing thermoplastic syntactic foams without the drawbacks mentioned above. This objective was unexpectedly achieved by the addition of from 20 to about 95 weight percent of a volatile liquid which is a non-solvent for the thermoplastic, an amount which is effective to form a stable slurry or paste of thermoplastic powder and microballoons. Such mixtures can be poured, painted, trowelled, or spatulaed onto surfaces or into molds without the possibility of being blown about or creating dust hazards.

In the most preferred embodiments, the subject invention compositions comprise a rubbery paste-like product which can easily be handled in a fashion similar to putty. Such compositions may be introduced into a mold, the volatile liquid removed at a temperature below the fusion temperature of the thermoplastic to form a "green" product which may be consolidated by raising the temperature to above the fusion temperature of the thermoplastic, or may be fused to a final product in one step. Such products find a wide variety of uses in the transportation field, for example in radomes and like structures requiring lightness coupled with impact resistance and load bearing capacity.

DESCRIPTION OF THE PREFERRED EMBODIMENTS

The unconsolidated thermoplastic syntactic foam compositions of the subject invention contain from 5 to 80 weight percent, preferably from 20 to 70 weight percent, and most preferably from about 40 to 60 weight percent of a mixture (a) of from 5 to 99 weight percent polymer a)i and from 1 to 95 weight percent of microballoons a)ii; and from 95 to 20 weight percent of b) a component comprising a non-solvent for the thermoplastic. In preferred embodiments, component b) further comprises additional ingredients including binders, stabilizers, and surfactants.

The polymer component a)i) comprises in major portion, a thermoplastic polymer. The thermoplastic polymer should have a melt viscosity at processing temperatures of less than about 10,000 Pa-sec. Examples of suitable thermoplastics include the various polyaryletherketones (PEEK, PEK, PEKEKK, PEEKK, etc.); polyarylethersulfones such as Ultrason® E and S, polyarylethersulfides such as polyphenylenesulfide; polyimides such as LARC-TPI and NEW-TPI; polyetherimides; polyphenylene ethers, aromatic and aliphatic nylons and copolymers thereof; polycarbonates; polyestercarbonates; polyesters; polyoxyalkylenes such as polyoxyethylene and polyoxymethylene; polystyrene; fluoropolymers; polyacrylates; polyalkylenes such as polyethylene and polypropylene; polyvinylchloride; and copolymers and terpolymers of styrene and butadiene and/or acrylonitrile and/or alkylacrylates. This list is by way of illustration and is not meant to be limiting.

The polymer component may also include a minor portion, i.e. up to about 30 weight percent, of a solid thermosetting polymer whose curing temperature is greater then the volatization temperature of the non-solvent portion of liquid component (b). Such thermosetting polymers include the solid epoxy resins, solid bismaleimides, solid cyanates, solid unsaturated polyesters, and the like. The polymer component a)i may also comprise polymers which illustrate thermoplastic behavior at low temperatures but crosslink at elevated temperatures, such as fully imidized polyimide PMR-15.

The particle size of the polymer component particles a)i) may vary across a wide range, i.e. from 0.1 μm to 100 μm or more. Preferably the mean polymer particle size is less then 100 μm, and best results are achieved when about 50 number percent of particles have sizes less then 30 μm. Thermoplastic powders having these particle sizes are available commercially, or may be prepared by cryogrinding, solution precipitation, spray drying, jet milling, sand milling, and other techniques known to those skilled in the art.

The microballoons a)ii of the subject invention have densities of from 0.05 to about 1.2 g/cm$^3$, preferably from 0.1 to about 0.8 g/cm$^3$, and particle sizes of 2 μm to 200 μm, preferably from 20 to 100 μm, and most preferably, from 30 to 80 μm. The microballoons may be made from numerous materials including borosilicate and quartz glasses and ceramic materials. For low melting thermoplastics, microballoons of thermosetting or thermoplastic polymers, for example polyphenols, polyureas, polyurethanes and the like may be used, so long as the particles are stable at the processing temperature of the syntactic foam. Glass and ceramic microballoons are preferred. Such microballoons are available from numerous commercial sources, for example from W.R. Grace under the tradename Eccosphere SDT microballoons. For special electromagnetic effects, the microballoons may be metal plated.

The liquid component (b) comprises a liquid which is not a solvent for the polymer component a)i). Such a non-solvent implies that the polymer component is substantially insoluble in the liquid. The preferred liquid is water, however other volatile aliphatic and aromatic alcohols and other organic liquids having a boiling point below the fusion temperature of the thermoplastic and preferably in the range of 60 C to 190 C may be utilized. Examples of such volatile liquids are methanol, ethanol, isopropanol, butanol, ethylene glycol monomethylether, ethylene glycol monoethylether, ethylene glycol monobutyl ether, ethylene glycol monoethylether acetate, phenol, cresol, hexane, toluene, and the like. To test the organic liquid for compatibility with the thermoplastic, thermoplastic powder may be added to the liquid or mixture of liquids and heated slightly. If the thermoplastic does not dissolve to any substantial extent or appear to swell in the liquid, then the liquid is a non-solvent within the meaning of the subject invention. Component b) should not contain a solvent for the thermoplastic.

The liquid component b) preferably contains thickeners, binders, and surfactants to enhance the properties of the slurry or paste. In particular, the presence of thickeners allow the preparation of slurries and pastes with lower solids levels at relatively high viscosities. Binders are helpful in particular if it is desired to remove at least a portion of the volatile nonsolvent at a temperature lower then the fusion temperature of the thermoplastic to prepare an intermediate product with sufficient cohesiveness that it may be handled or even shipped prior to final forming or fusion. Surfactants, for example wetting agents, may be helpful in preparing and providing a stable dispersion, particularly at low solids levels. Finally, a second miscible liquid, which may be one of the list of non-solvents cited earlier, may be added to enhance the stability of the mixture. When water is used as the principle volatile non-solvent liquid, for example, a lower alcohol may enhance stability of the dispersion.

In many cases, various surface active agents may provide more then one of the functions listed above. For example, the Carbopol ® polyacrylates available from the B.F. Goodrich Co. may provide both thickening and binding properties. Similarly, high molecular weight polyoxyethylene glycols may provide both thickening and binding properties, and in some cases, surfactant properties. In general, the total of binders, thickening agents, and wetting agents will comprise less then about 5 weight percent of the total unconsolidated syntactic foam composition, preferably, less then 3 weight percent, and most preferably less then about 0.5 weight percent. The amount of stabilizer when present, is less than 5 weight percent, and preferably about 2 weight percent or less.

Examples of suitable thickeners are high molecular weight essentially non-associative thickeners such as the polyacrylates, polyvinylpyrrolidones, polyvinyl alcohols, polymaleic acids, polyoxyalkylates and the like. Particularly suitable, for example, are the lightly crosslinked polyacrylic acids available from the B.F. Goodrich Co. under the tradename Carbopol ® water soluble resins. Especially preferred are Carbopol ® 910, Carbopol ® 934, and Carbopol ® 941. Such polyacrylic acids have molecular weights of from 450,000 to 4,000,000 Daltons, preferably 750,000 to 3,000,000 Daltons.

Copolymers, terpolymers, and higher order polymers containing two, three, or more monomeric units respectively, are also suitable. For example, polymers containing two or more repeating units of acrylic acid, methacrylic acid, methylacrylate, methylmethacrylate, maleic acid, maleic anhydride, dimethylmaleate, other alkylacrylates, vinylpyrrollidone, and the like. Polymers containing acidic, basic or amphoteric groups are particularly suitable as the adjustment of the pH of the dispersion may be used to dramatically alter the viscosity of the dispersion.

High molecular weight polyoxyalkylene glycols, particularly polyoxyethylene glycols are also useful. Generally, molecular weights in excess of 500,000 Daltons, preferably 1,000,000 Daltons are useful. Examples of these are the POLYOX ® polyoxyethylene glycols available from the Union Carbide corporation. In general, the higher the molecular weight, the greater the thickening efficiency. All the foregoing polymers may also serve as a binder in the syntactic foam systems of the subject invention. Thickeners which demonstrate shear thinning (non-Newtonian) viscosity characteristics may be preferable in some applications. Examples of such systems include polyacrylic thickeners whose pH is raised by addition of base as described in U.S. Pat. No. 4,894,105 which is herein incorporated by reference.

Associative thickeners may also be useful. Such thickeners generally contain at least a plurality of polymeric structure, one portion of which is compatible with the non-solvent of the syntactic foam system while the other is incompatible. For example, in aqueous systems, the compatible or hydrophilic portion may be a polyoxyethylene moiety, a polyacrylic acid moiety, or a polyvinyl alcohol moiety. To this hydrophilic moiety is attached a minimum of two hydrophobic moieties, which are generally long chain alkyl groups attached to the hydrophile by suitable linkages, for example ester, amide, or ether linkages. The hydrophile may be difunctional, trifunctional, or higher functional.

Suitable associative polyether thickeners are disclosed in U.S. Pat. Nos. 4,310,436, 4,395,351, 4,665,239, and 4,810,503, which are herein incorporated by reference. With a given molecular weight and functionality polyoxyethylene or polyoxyethylene-polyoxypropylene hydrophile, the size of the hydrophobe will determine both thickening efficiency and non-Newtonian viscosity characteristics. For example, with hydrophobes derived from $C_{20}$ or higher alkylene oxides, and a suitable hydrophile, thickening power will be high, and the resultant dispersion will exhibit great shear thinning behavior.

While many of the above thickeners may also serve the function of binders, it may be desirable to prepare a system without thickener but with a binder. In this case, low molecular weight products may be suitable. Examples are low molecular weight polyacrylates, polyvinyl alcohols, and polyoxyalkylene glycols. Also suitable as binders are water soluble or dispersible binders useful in other fields, such as in the preparation of foundry cores, as binders in paper, and the like. Examples include various polyphenolic resins, epoxy resin latices, urethane latices, styrene-butadiene, styrene-acrylonitrile, and styrene-butadiene-acrylonitrile latices. The solid thermosetting polymers which may form a minor portion of the polymer component a)i may also serve as binders either through fusing and solidifying at modestly elevated temperatures or by partial or thorough curing at temperatures less than the thermoplastic fusion temperature.

Suitable as surfactants are a wide variety of anionic, cationic, and nonionic surfactants, for example as disclosed in the treatise by Martin Schick, Ed., *Nonionic Surfactants*, Marcel-Dekker 1967. Especially preferred are the oxyethylated and oxyethylated-oxypropylated block, heteric, and block heteric surfactants initiated with aliphatic alcohols, alkylphenols, alkylene glycols, and polyhydric phenols. Particularly preferred are the alkylphenol polyoxyethyleneol surfactants available from the Rohm and Haas Corporation under the trademark Triton ® X100 surfactants. When the non-solvent is other than water, other surfactants may be found in accordance with the theories of surfactant technology. For example, while polyoxyethylene alcohols and glycols may be suitable in purely aqueous systems, aliphatic alcohol non-solvents may require polyoxypropylene or polyoxybutylene alcohols and glycols. Suitable surfactants may readily be determined by addition of trial surfactants to a system prone to separation or settling and determining storage stability with respect to time.

Fillers may also be added to the syntactic foam compositions of the subject invention. These may be added, in the case of finely divided metal particles, conductive carbon or graphite particles or flakes, metal oxide particles, or metal coated short fibers or whiskers, to alter the electrical and/or electromagnetic characteristics of the foam, or, in the case of staple reinforcing fibers of glass, quartz, teflon, or polyaramid, to increase the physical strength of the foam in tension and/or compression. Fillers such as finely divided clays, talc, amorphous silica and the like may be added to alter the viscosity or viscosity characteristics of the uncured, unsintered syntactic foam-forming composition.

The subject invention may now be illustrated by way of examples. These examples should be taken as illustrative and not as limiting the scope of the invention in any way.

EXAMPLE 1

Thermoplastic Slurry

To 3461.5 g deionized water was added 1.540 g Triton ® X 100 Surfactant (Rohm & Haas) with stirring. A mixture was prepared from 5.15 g Carbopol ® 941 and 3.85 g Carbopol ® 910 partially crosslinked polyacrylic acids (B.F. (Imperial Chemical Industries) having a mode particle size such that the diameters of 50 percent of the particles were less then 8.6 $\mu$m and the diameters of 90 percent of the particles less than 13.8 $\mu$m as determined as volume distribution by Malvern Instruments EASY Particle Sizer M3.1. This mixture was added slowly to the water-surfactant mixture with gentle stirring over a period of 2.5 hours. The slurry was then stirred for an additional 2.5 hours to ensure complete wetting of all particles. To the slurry was then added 17.31 g of 9.3 weight percent $NH_4OH$ solution in deionized water to bring the slurry pH to 7.08. To the alkaline slurry was added all at once a mixture of 6.46 g Polyox ® WSR-303 nonionic polyoxyethylene glycol water soluble resin (Union Carbide) dissolved in 105.0 g isopropanol. The mixture was agitated at low speed for one hour. Viscosity of the system using a #5 spindle showed a Brookfield viscosity of 100,000 cps at 0.5 $min^{-1}$, 64,000 cps at 1.0 $min^{-1}$, 9,560 cps at 20 $min^{-1}$, and a Brookfield yield value of 360 cps.

EXAMPLE 2

Syntactic Foam Forming Putty

To 815.7 g of the slurry of Example 1 was added 287.8 g of Emerson Cummings borosilicate glass Eccosphere SI microballoons having a size distribution such that 36 percent have diameters greater than 100 $\mu$m, 40 percent have diameters between 64 and 100 $\mu$m, and 15 percent have diameters between 46 and 63 $\mu$m. This composition was mixed by hand until a uniform paste resulted.

EXAMPLE 3

Syntactic Foam

A copper mold measuring 15.2 cm by 22.9 cm was coated with Frekote 44 mold release and lined with Kapton ® film. The open mold was filled with the putty of Example 2 and heated in a 250 F (121 C) oven for 7.5 hours to form an intermediate sintered but nonfused product. The foam raised slightly over the mold edge.

The filled mold was then placed in a Dake press, the pressure increased to 150 psi (1.03 MPa) and the temperature raised at a rate of 10 F (5.5 C) per minute to 735 F (391 C) and held for 45 minutes. Maximum temperature excursion during this period was 746 F (397 C). The mold was cooled in the press for 1.5 hours reaching a temperature of 250 F (121 C). The plaque was demolded and found to have a density of 38.028 $lbs/ft^3$ (0.6092 $g/cm^3$).

We claim:

1. An unconsolidated thermoplastic syntactic foam-forming composition, comprising:
    a) from 5 to about 80 weight percent of a thermoplastic component comprising from 5 to about 99 weight percent based on the total weight of component a) of i) a particulate thermoplastic component comprising a major portion of a thermoplastic having a melt viscosity at the sytactic foam processing temperature of less than about 10,000 Pa-sec and a mean particle size less than about 100 μm wherein said thermoplastic is selected from the group consisting of the aliphatic polyamides, polyarylamides, polyarylene sulfones, polyarylene ketones, polyarylene ether ketones, polyarylene ether sulfones, polyarylene sulfides, polyphenylene oxides, polyimides and mixtures thereof; and ii) from 1 to about 95 weight percent of microspheres having a mean particle size less than about 200 μm; and b) from 20 to about 95 weight percent of a component comprising a volatile liquid which is a non-solvent for the thermoplastic wherein said non-solvent has a boiling point below the fusion temperature of said thermoplastic and between 60° C. and 190° C., and c) optionally fillers and reinforcing fibers, in the substantial absence of a solvent for the thermoplastic component a)i.

2. The foam-forming composition of claim 1 wherein said component a) comprises from 20 to about 70 weight percent of the total foam-forming composition and component b) comprises from 80 to about 30 weight percent of the composition.

3. The foam-forming composition of claim 1 wherein said component a) comprises from 40 to about 60 weight percent of the total foam-forming composition and component b) comprises from 60 to about 40 weight percent of the composition.

4. The composition of claim 1 wherein component a) is comprised of 10 to about 80 weight percent of thermoplastic component a)i; and from 90 to about 20 weight percent microspheres component a)ii.

5. The composition of claim 2 wherein component a) is comprised of 10 to about 80 weight percent of thermoplastic component a)i; and from 90 to about 20 weight percent microspheres component a)ii.

6. The composition of claim 3 wherein component a) is comprised of 10 to about 80 weight percent of thermoplastic component a)i; and from 90 to about 20 weight percent microspheres component a)ii.

7. The composition of claim 1 wherein component a) is comprised of 30 to about 60 weight percent of thermoplastic component a)i; and from 60 to about 30 weight percent of component a)ii.

8. The composition of claim 2 wherein component a) is comprised of 30 to about 60 weight percent of thermoplastic component a)i; and from 60 to about 30 weight percent of component a)ii.

9. The composition of claim 3 wherein component a) is comprised of 30 to about 60 weight percent of thermoplastic component a)i; and from 60 to about 30 weight percent of component a)ii.

10. The composition of claim 1 wherein said non-solvent b) comprises water.

11. The composition of claim 3 wherein said non-solvent b) comprises water.

12. The composition of claim 4 wherein said non-solvent b) comprises water.

13. The composition of claim 6 wherein said non-solvent b) comprises water.

14. The composition of claim 7 wherein said non-solvent b) comprises water.

15. The composition of claim 9 wherein said non-solvent b) comprises water.

16. The composition of claim 1 wherein component a) further comprises a minor portion of a particulate thermosetting resin.

17. The composition of claim 3 wherein component a) further comprises a minor portion of a particulate thermosetting resin.

18. The composition of claim 4 wherein component a) further comprises a minor portion of a particulate thermosetting resin.

19. The composition of claim 7 wherein component a) further comprises a minor portion of a particulate thermosetting resin.

20. The composition of claim 9 wherein component a) further comprises a minor portion of a particulate thermosetting resin.

21. The composition of claim 10 wherein component a) further comprises a minor portion of a particulate thermosetting resin.

22. The composition of claim 15 wherein component a) further comprises a minor portion of a particulate thermosetting resin.

23. The composition of claim 1 wherein component b) further comprises up to 5 weight percent based on the weight of the total foam-forming composition of binders, thickeners, or surfactants.

24. The composition of claim 4 wherein component b) further comprises up to 5 weight percent based on the weight of the total foam-forming composition of binders, thickeners, or surfactants.

25. The composition of claim 9 wherein component b) further comprises up to 5 weight percent based on the weight of the total foam-forming composition of binders, thickeners, or surfactants.

26. The composition of claim 10 wherein component b) further comprises up to 5 weight percent based on the weight of the total foam-forming composition of binders, thickeners, or surfactants.

27. The composition of claim 16 wherein component b) further comprises up to 5 weight percent based on the weight of the total foam-forming composition of binders, thickeners, or surfactants.

28. The composition of claim 23 wherein said thickener is selected from the group consisting of polyacrylic acids, polyvinyl alcohols, polyvinylpyrollidones, and polyoxyalkylene glycols.

29. The composition of claim 23 wherein said thickener is an associative thickener and wherein said dispersion exhibits non-Newtonian rheology.

30. The composition of claim 26 wherein said thickener is a lightly crosslinked polyacrylic acid having a molecular weight of greater than 750,000 Dalton molecular weight.

31. The composition of claim 26 wherein said surfactant is polyoxyalkylated alkylphenol.

32. A process for preparing a fusible, sintered syntactic foam-forming intermediate product comprising heating the composition of claim 24 to a temperature sufficient to volatize a portion of said non-solvent b) to form a product which may be handled without any substantial damage.

33. A process for preparing a fusible, sintered syntactic foam-forming intermediate product comprising heating the composition of claim 26 to a temperature sufficient to volatize a portion of said non-solvent b) to form a product which may be handled without any substantial damage.

34. A process for the preparation of a thermoplastic syntactic foam, comprising heating the composition of claim 24 in a mold to drive off substantially all the nonsolvent b) followed by further heating at or above the fusion temperature of the thermoplastic component a)i; for a time sufficient to fuse said thermoplastic.

35. A process for the preparation of a thermoplastic syntactic foam, comprising heating the composition of claim 26 in a mold to drive off substantially all the nonsolvent b) followed by further heating at or above the fusion temperature of the thermoplastic component a)i; for a time sufficient to fuse said thermoplastic.

36. A process for preparing a thermoplastic syntactic foam product, comprising heating at a temperature at or above the fusion temperature of the thermoplastic component a)i, the intermediate product of claim 32.

37. A process for preparing a thermoplastic syntactic foam product, comprising heating at a temperature at or above the fusion temperature of the thermoplastic component a)i, the intermediate product of claim 33.

38. The composition of claim 1 wherein the viscosity of the syntactic foam-forming composition is greater then about 1000 cps at 10 $sec^{-1}$.

39. The composition of claim 10 wherein the viscosity of the syntactic foam-forming composition is greater then about 1000 cps at 10 $sec^{-1}$.

40. The composition of claim 31 wherein the viscosity of the syntactic foam-forming composition is greater then about 1000 cps at 10 $sec^{-1}$.

41. The composition of claim 30 wherein the viscosity of the syntactic foam-forming composition is greater then about 1000 cps at 10 $sec^{-1}$.

* * * * *